US007021454B2

(12) United States Patent
Ozaki et al.

(10) Patent No.: US 7,021,454 B2
(45) Date of Patent: Apr. 4, 2006

(54) CONVEYOR CHAIN

(75) Inventors: Hajime Ozaki, Osaka (JP); Yoshihiro Murakami, Osaka (JP); Katsutoshi Shibayama, Osaka (JP)

(73) Assignee: Tsubakimoto Chain Co., Osaka (JP)

(*) Notice: Subject to any disclaimer, the term of this patent is extended or adjusted under 35 U.S.C. 154(b) by 0 days.

(21) Appl. No.: 11/063,171

(22) Filed: Feb. 22, 2005

(65) Prior Publication Data

US 2005/0241920 A1 Nov. 3, 2005

(30) Foreign Application Priority Data

Apr. 28, 2004 (JP) ............................ 2004-133981

(51) Int. Cl.
*B65G 17/24* (2006.01)

(52) U.S. Cl. ................................ 198/779; 193/35 MD; 198/853

(58) Field of Classification Search ........ 198/850–853, 198/779; 193/35 MD
See application file for complete search history.

(56) References Cited

U.S. PATENT DOCUMENTS 6,209,714 B1 * 4/2001 Lapeyre et al. ............. 198/779
6,367,616 B1 * 4/2002 Lapeyre et al. ............. 198/779
6,681,922 B1 * 1/2004 Corley et al. ............... 198/853
2003/0221932 A1 * 12/2003 Costanzo .............. 193/35 MD
2005/0155846 A1 * 7/2005 Sofranec et al. ............ 198/779

FOREIGN PATENT DOCUMENTS

JP 2003-182829 7/2003

* cited by examiner

*Primary Examiner*—James R. Bidwell
(74) *Attorney, Agent, or Firm*—Woodling, Krost and Rust

(57) ABSTRACT

To provide a conveyor chain, which easily can laterally discharge articles conveyed by the conveyor chain and easily can make U-turn and in which a count of parts of the chain links forming the conveyor chain can be reduced and the assembly, explosion and parts replacement and the like can be easily performed. A conveyor chain 1 is formed in such a manner that a plurality of chain links 2 each having a plurality of hinge portions 4, 5 respectively formed on both side edges of article loading portions 3, are adjacently, endlessly connected to each other with hinge pins. A gap portion 8 is provided between hinge portions 4, 4 formed on one-side edges in the article loading portions 3, and a ball unit 12 rotatably holding a free ball 16 in a split cover 15 consisting of a upper cover 13 and a lower cover 14 is attached to the gap portion 8. The upper and lower portions of the free ball 16 protrudes from opening portions 13*a*, 14*a* of the upper and lower covers 13, 14 and protrudes from the upper and lower surfaces of the conveyor chain 1.

2 Claims, 8 Drawing Sheets

CONVEYOR CHAIN

This patent application claims priority to Japanese Patent Application No. 2004-133981 filed Apr. 28, 2004.

TECHNICAL FIELD

The present invention relates to a conveyor chain suitable for loading articles each having a flat bottom surface, such as a box-shaped article, a plate-shaped article or the like and for conveying it, and more specifically it relates to a conveyor chain provided with a number of free balls, which rotate freely, and in which upper and lower portions of the free ball protrude from a upper surface and a lower end of the conveyor chain respectively.

BACKGROUND TECHNOLOGY

As a conveyor belt, which is one of conveyor chains for loading articles thereon to convey them, a conveyor belt in which a rotatable ball or roller is provided in a belt module forming the conveyor belt and the articles are handled during conveyance to slide them toward a lateral side and discharge them, has been known (Japanese Laid-Open Patent Publication No. 2003-182829).

In the above-mentioned conveyor belt a belt module on which articles are loaded is formed of an integrated structure stacked by an upper first member and a lower second member, hinge portions respectively formed on the first member and the second member are joined to form a hinge portion of a belt module, and this belt modules are connected to each other with hinge pins to form the conveyor belt. This belt module includes rotatable balls or rollers and is adapted so that an article conveyed by a conveyor belt is slid on a belt to be discharged toward a lateral side. An opening portion is formed in the first member and the second member respectively, and when the first member and the second member are joined with each other, a ball-receiving portion is formed so that a ball can be rotatably held on the ball receiving portion.

Patent Reference 1 is Japanese Laid-open Patent Publication No. 2003-182829.

PROBLEMS TO BE SOLVED BY THE INVENTION

However, since in a conventional conveyor belt, which is one of conveyor chains, a belt module has a structure in which joined first and second members sandwiches a ball, there is a problem that a parts count is increased. Further, there is a problem that even in a case where one ball is removed to be replaced, the joined belt module must be split after pulling a hinge pin, which makes the operation complicated.

Thus, the objects of the present invention are to solve the above-mentioned related art problems and to provide a conveyor chain, which can easily discharge articles conveyed by the conveyor chain laterally and can easily make U-turn and in which a count of parts of the chain links forming the conveyor chain can be reduced and the assembly, explosion and parts replacement and the like can be easily performed.

MEANS FOR SOLVING THE PROBLEMS

The present invention has solved the above-mentioned problems based on such conceptions that loading portions forming a chain link is formed of one member, a ball unit is attached to a gap portion formed by utilizing a gap between hinge portions in the loading portions so that a parts count of the conveyor chain is reduced, and that the ball unit is formed so as to hold a rotatable free ball in a split cover whereby the assembly, explosion and parts replacement and the like can be easily performed.

Based on the conceptions, the present invention according to claim 1 has a configuration that a conveyor chain wherein a plurality of chain links each having a plurality of hinge portions respectively formed on both side edges of article loading portions, and having links formed on the lower surfaces of said loading portions, are adjacently, endlessly connected to each other with hinge pins, characterized in that a gap portion is provided between hinge portions formed on one-side edges in said article loading portions, a ball unit rotatably holding a free ball in a split cover consisting of an upper cover having an opening portion and a lower cover having an opening portion is attached to said gap portion and said upper and lower portions of said free ball protrudes from the opening portions of said upper and lower covers and protrudes from a surface of the loading portion and a lower end of the link respectively.

The present invention according to claim 2 has a configuration that in the conveyor chain according to claim 1, a vertical slit is formed in the upper cover and the lower cover consisting of said split cover, respectively.

EFFECT OF THE INVENTION

According to the present invention of claim 1, since the loading portions of a chain link forming a conveyor chain is formed of one member, a chain link's parts count can be reduced. Further, since a plurality of hinge portions are formed at both side edges of the loading portions, and a gap portion is provided between hinge portions formed on side edges of the loading portions so that a ball unit rotatably holding a free ball in a split cover consisting of a upper cover having an opening portion and a lower portion having an opening portion is attached to the gap portion, the split cover forming the ball unit can hold the free ball not so as be removed.

The attachment of the free ball to the chain link can be performed by the attachment of the ball unit to the gap portion, and the parts replacement of the free ball, the split cover or the like can be performed only by pulling out the hinge pin to separate chain link from each other, whereby a predetermined ball unit can be removed. As a result, the assembly and explosion of the conveyor chain and the parts replacement of the free ball or split cover and the like can be easily performed.

Further, since the upper and lower portions of the free ball protrude from the opening portions of the upper and lower covers and protrude from the surface of the loading portion and the lower end of the link, respectively, box-shaped and plate-shaped articles loaded on a conveyor chain can be slid and turned by free rotation of the free balls protruding from the upper surface of the conveyor chain. As a result, the discharge of articles in any direction during conveyance can be easily performed. Further, in a case where a guide plate is arranged on a lower surface side of the conveyor chain and the lower portion of the free ball, which protrudes from a lower end of a link, abuts on the guide plate, the free ball is rotated in the traveling direction in accordance with the traveling of the conveyor chain. Thus, the articles can be conveyed more speedily than the chain speed (at a double speed) with the guide plate arrangement portion.

According to the present invention of claim 2, since a vertical slit is formed in the upper cover and lower cover forming the split cover respectively, the insertion of the ball unit rotatably holding the free ball into the gap portion can be easily made. However, force for the ball unit to be pushed out of the gap portion in the link is acted by the traveling direction of the chain. Nevertheless since slits are provided in the split cover, a force to widen the slit at a portion the free ball contacts acts on the split cover so that the ball unit can be prevented from being removed from the gap portion (see FIG. 8).

A better understanding of the invention will be had when reference is made to the Brief Description of the Drawings and the Detailed Description of the Invention below.

A better understanding of the drawings will be had when reference is made to the Description of the Invention and Claims which follow hereinbelow.

DETAILED DESCRIPTION

Figure 1:
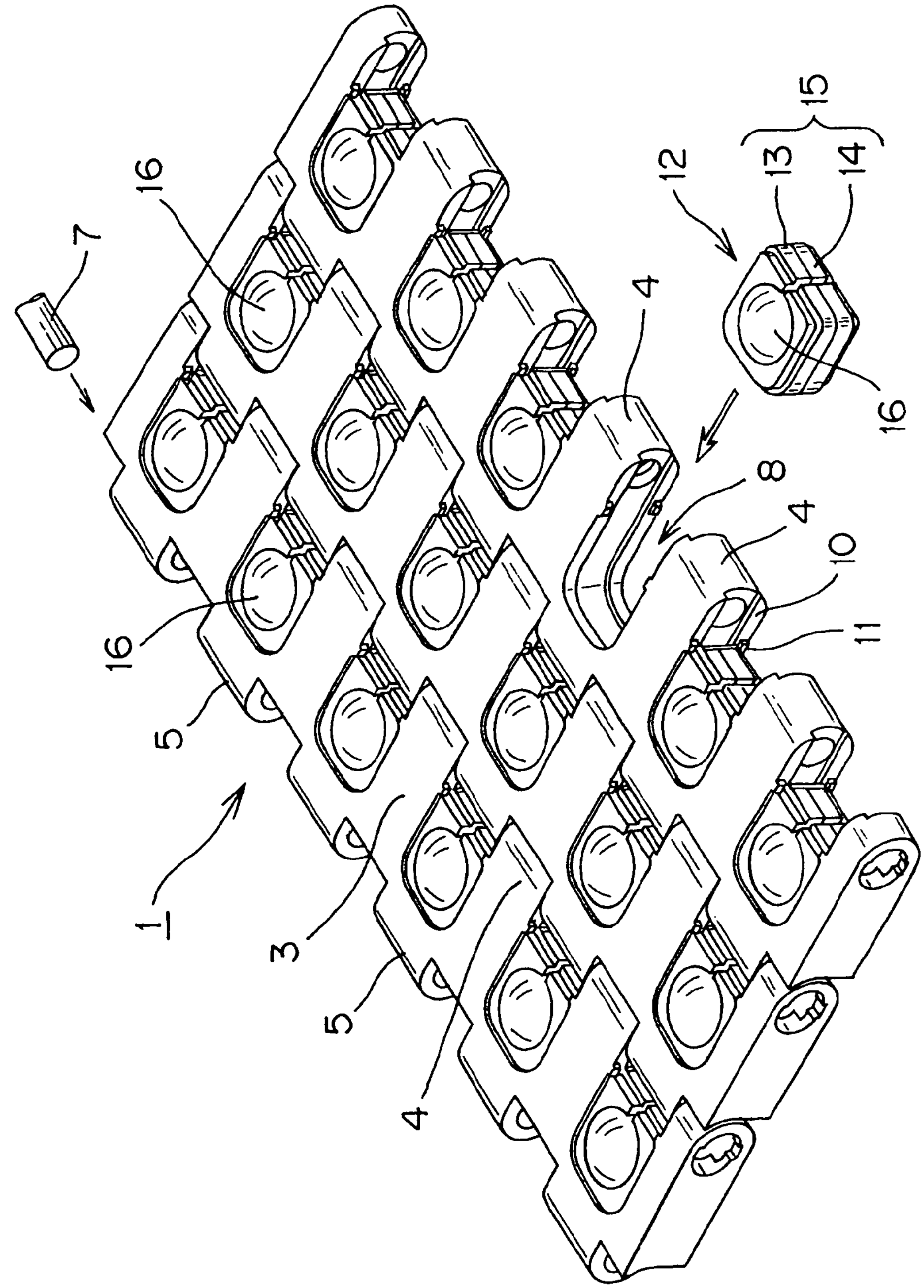
FIG. 1 shows an example of the present invention and is a perspective view of a part of a conveyor chain viewed from the surface side.
Figure 7:
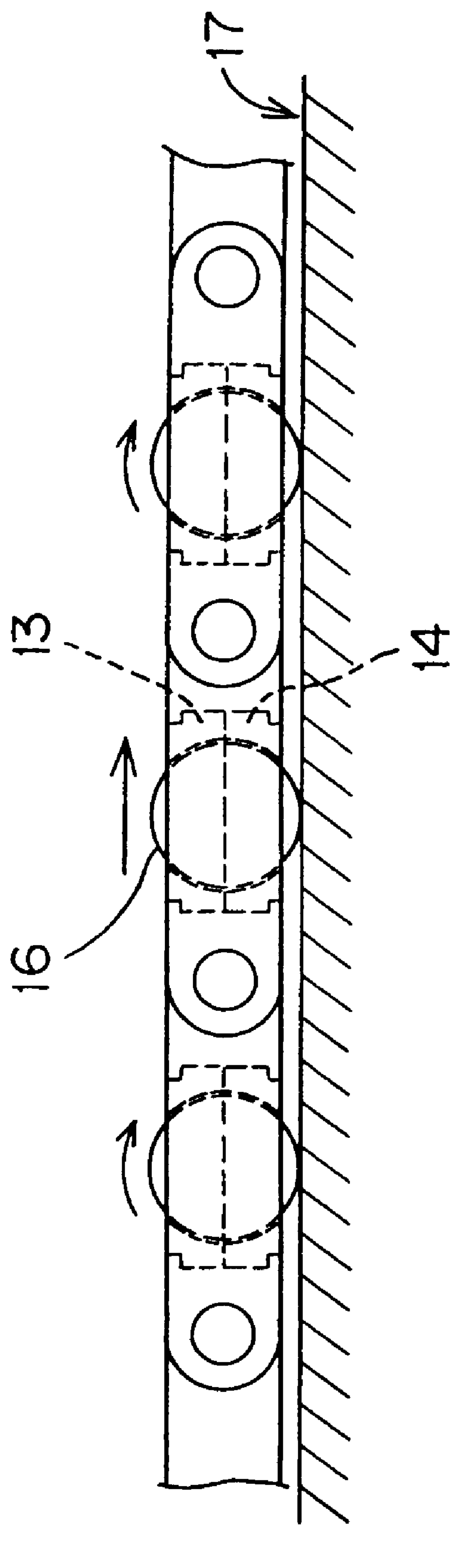
FIG. 7 is an explanatory view showing an operation state of the conveyor chain of the example.
Figure 8:
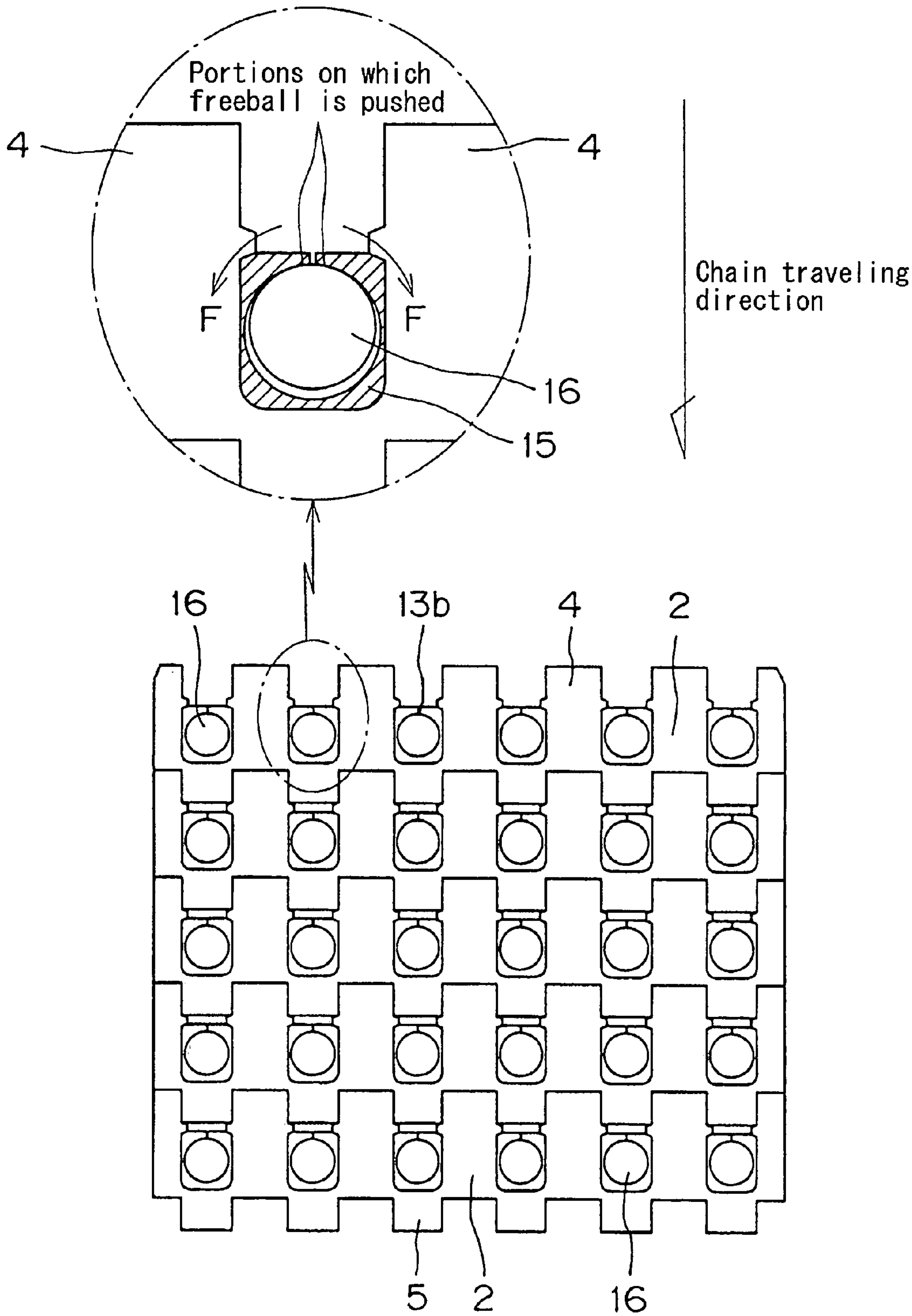
FIG. 8 is an explanatory view showing an effect of the slit provided in a slit cover of the example.

An example of the present invention will be described with reference to FIGS. 1 to 8. FIG. 1 is a perspective view of a part of a conveyor chain viewed from the surface side, FIG. 2 is a perspective view of a chain link viewed from the surface side (conveying surface), FIG. 3 is a perspective view of a part of the conveyor chain viewed from the back side, FIG. 4 is a perspective view of the chain link viewed from the back side, FIG. 5 is an exploded view of a ball unit, FIG. 6 is an explanatory view showing one example of an arrangement state of a chain link forming the conveyor chain, FIG. 7 is an explanatory view showing an operation state of the conveyor chain and FIG. 8 is an explanatory view showing the effect of a slit provided in a split cover.

Figure 3:
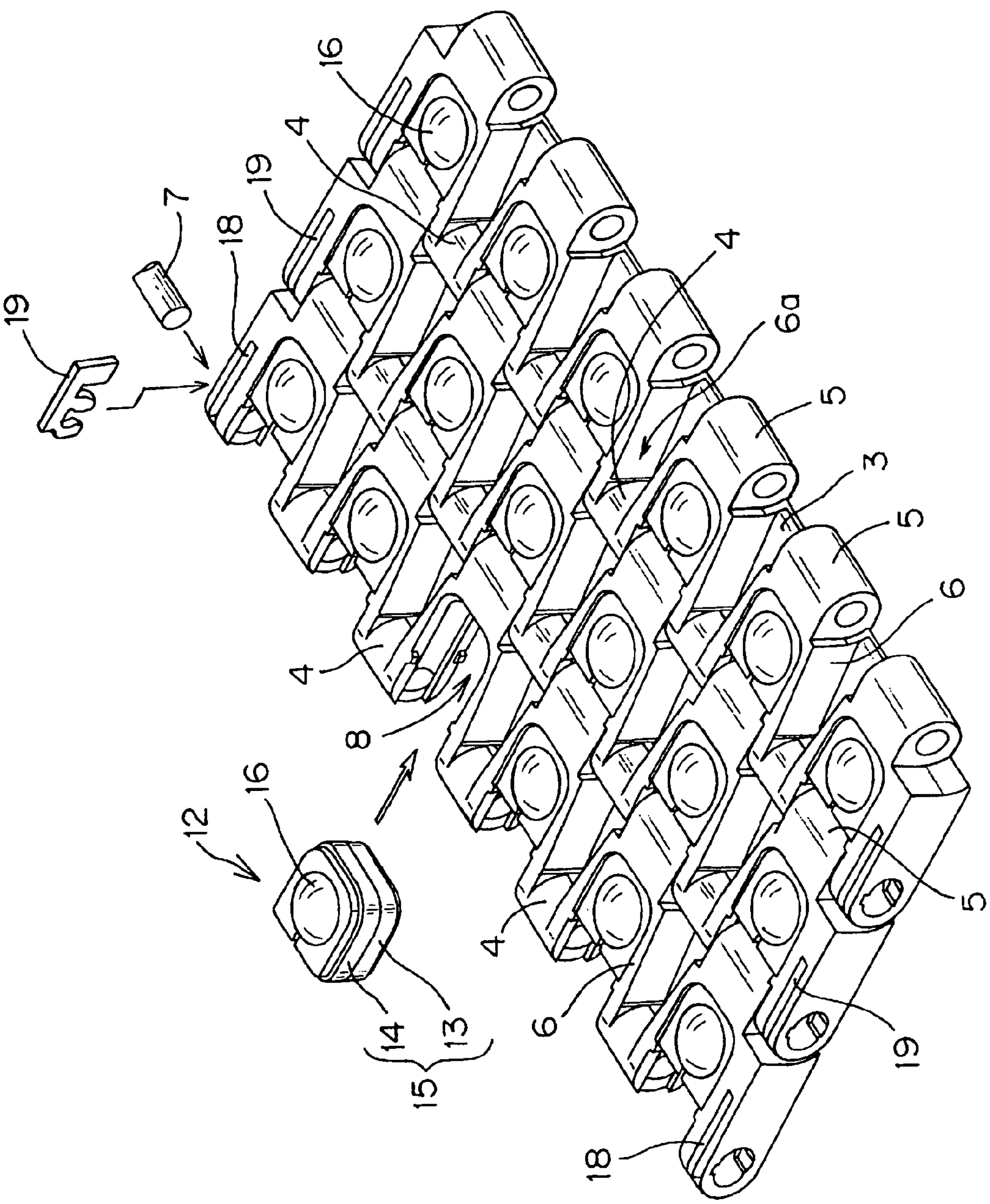
FIG. 3 is a perspective view of a part of the conveyor chain of the example viewed from the back side.

As shown in FIGS. 1 and 3, a conveyor chain 1 is substantially comprised of a plurality of chain links 2 having loading portions 3 on upper surfaces of which articles are loaded, hinge pins 7, split covers 15, free balls 16 and pin disengagement preventing members 19.

Figure 2:
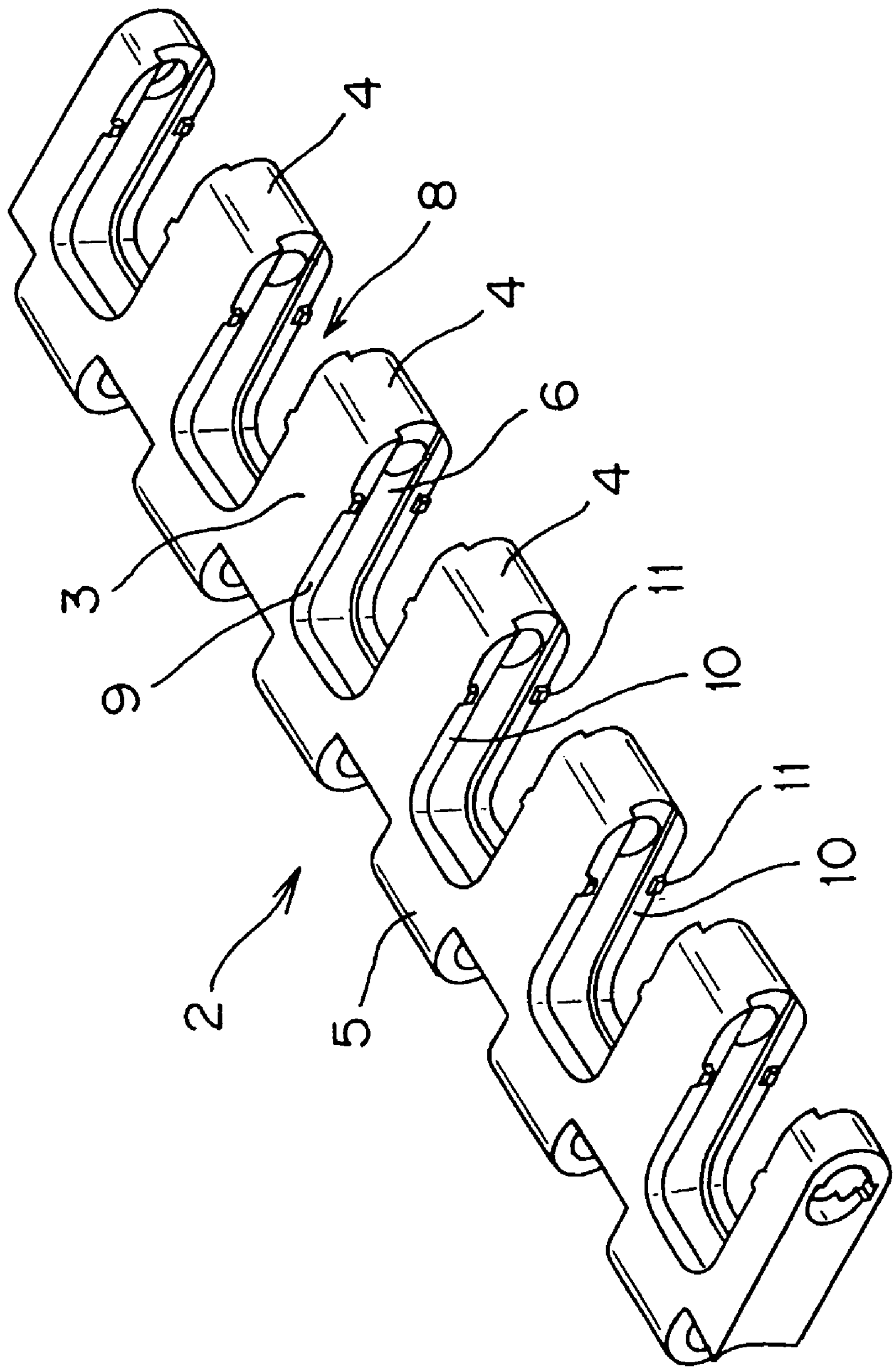
FIG. 2 is a perspective view of a chain link in the conveyor chain of the above-mentioned example viewed from the surface side.
Figure 4:
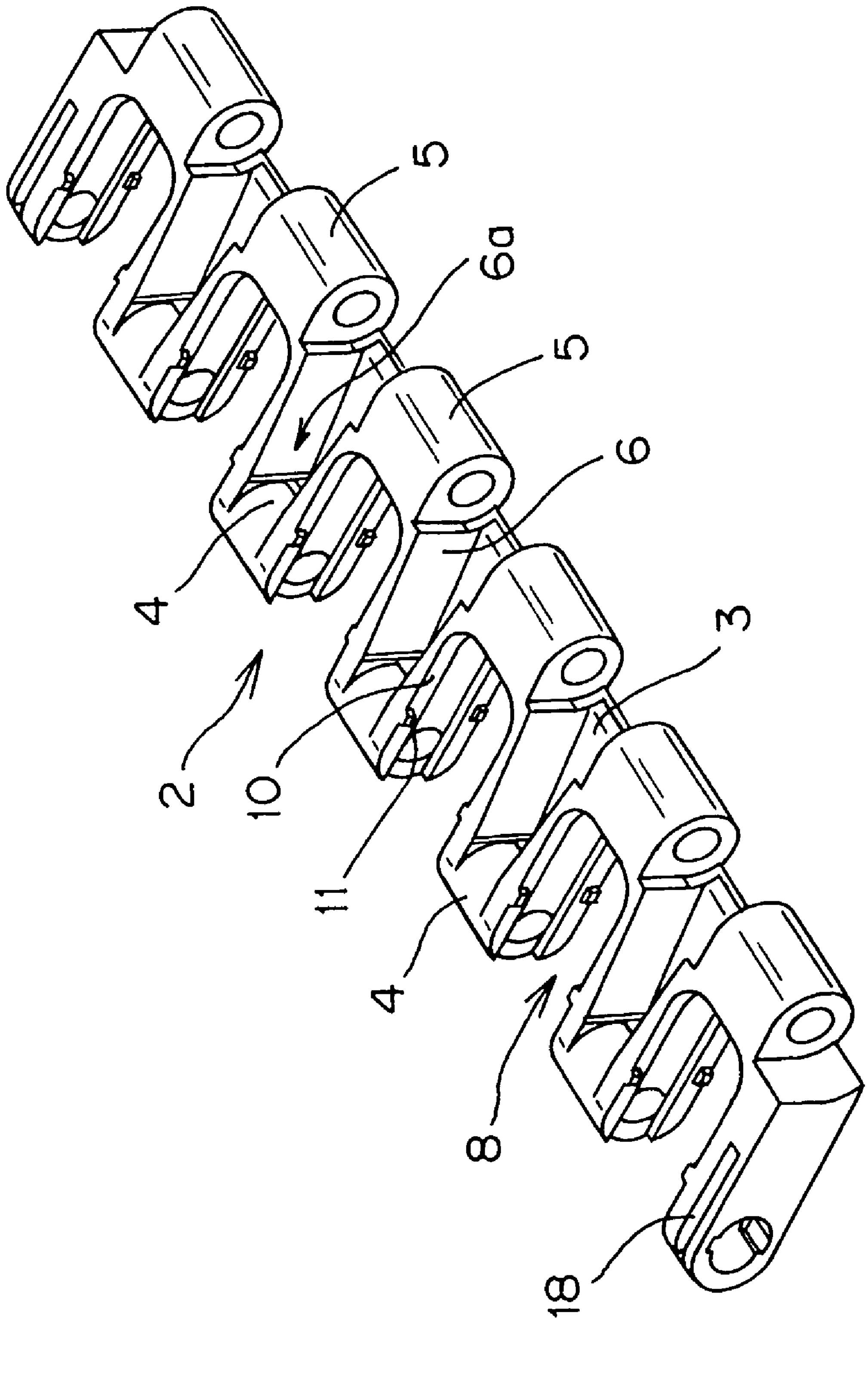
FIG. 4 is a perspective view of the chain link of the example viewed from the back side.
Figure 5:
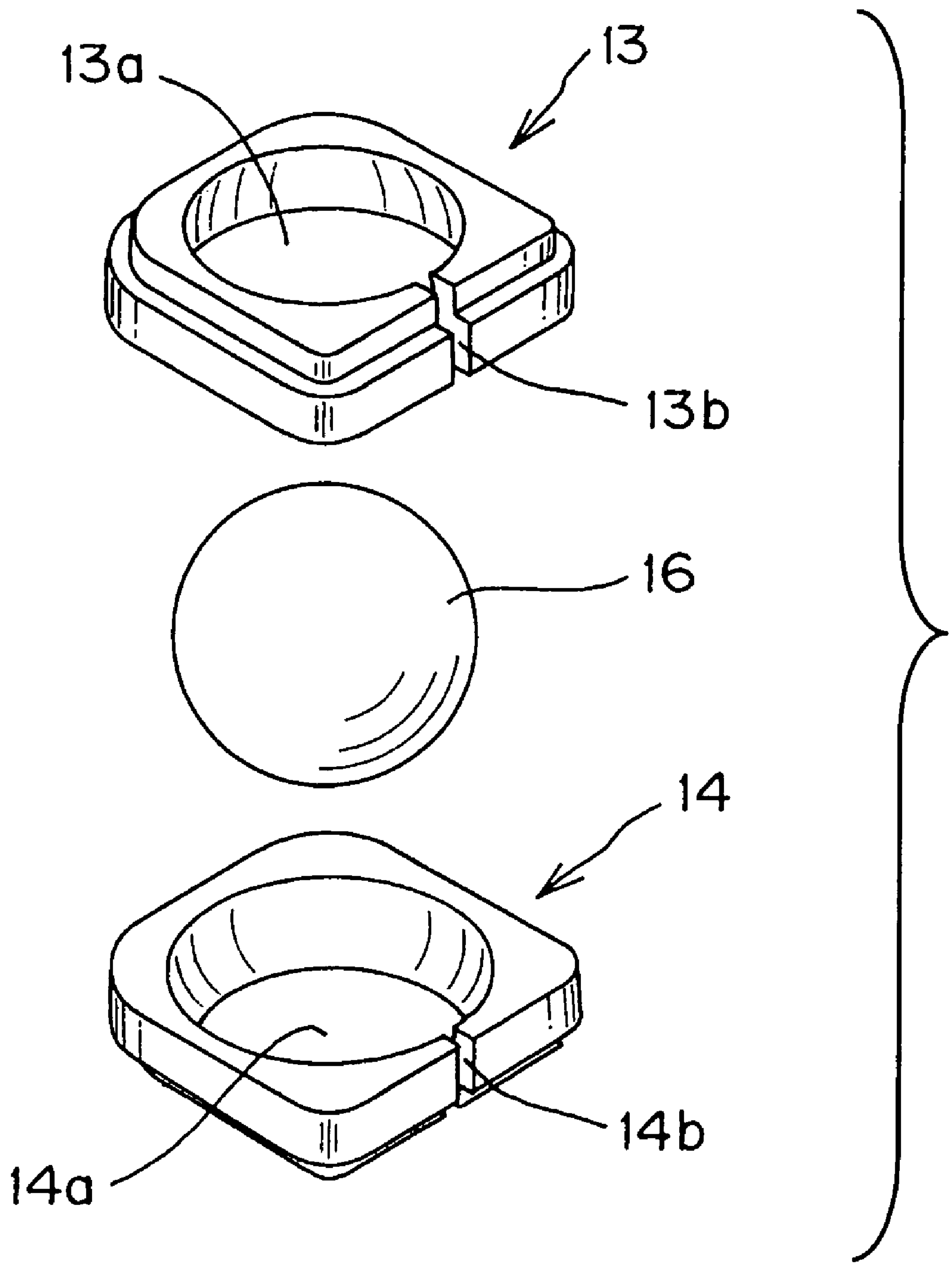
FIG. 5 is an exploded view of a ball unit of the example.

As shown in FIGS. 2 and 4, a chain link 2 includes a plurality of hinge portions 4 and 5 formed on front and rear both side edges of loading portions 3 and further includes a plurality of links 6 formed on lower surfaces of the loading portions 3. The chain link 2 is made of a plastic and integrally molded. In a conveyor chain 1 the plurality of chain links 2 are adjacently endlessly connected to each other with hinge pins 7. A gap portion 8 is formed near the connecting portion, and a ball unit 12 rotatably holding a free ball 16 is attached to this gap portion 8. It is noted that although in FIGS. 1 and 3, only a part of the length of the hinge pin 7 is shown, the length of the hinge pin 7 is substantially the same as that of the chain link 2 and is one which is just accommodated between grooves 18 and 18 of both ends of the chain link 2. To this groove 18 is fitted a pin disengagement preventing member 18.

Figure 6:
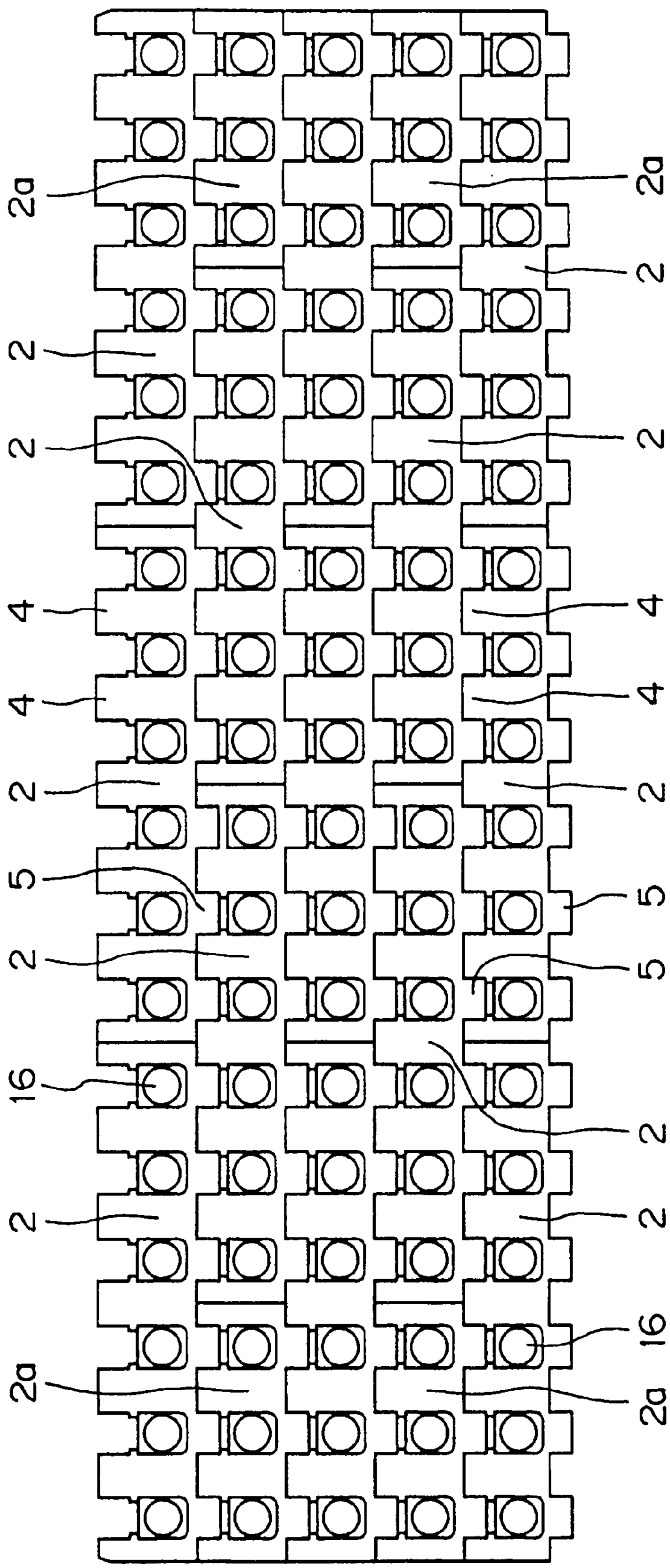
FIG. 6 is an explanatory view showing one example on an arrangement state of chain links forming a conveyor chain of an example of the present.

In the conveyor chain 1 the chain links 2 may be assembled in a state where they are aligned in a longitudinal direction as shown in FIG. 1, longer chain links 2 and shorter (for example half length) chain links 2*a* may be assembled in a bricks laid state to obtain wider width as shown in FIG. 6.

The gap portion 8 is formed of a cutout portion 9 formed in a manner where a part is cut out between hinge portions 4, 4 formed on one-side edges of the loading portions 3 and links 6 provided on a back side of the loading portion 3 while straddling the cutout portion 9. In this case, it is not necessary to provide ball units 12 between the all hinge portions 4, 4. Alternatively, the gap portions 8 are formed at appropriate intervals so that ball units 12 may be provided in a predetermined number. On both sides of this gap portion 8 are formed a upper step portion 10 and a lower step portion 10, which act as guide portions for the ball unit 12 when it is inserted from between the hinge portions 4, 4. On the respective step portions 10 are formed engagement protrusions 11, which act as engagement preventing members for the inserted ball unit 12.

The ball unit 12 rotatably holds a free ball 16 in a split cover 15 consisting of an upper cover 13 having an opening portion 13*a* and a lower cover 14 having an opening portion 14*a*. The upper and lower portions of the free ball 16 accommodated in the split cover 15 are exposed and protruded from the opening portions 13*a* and 14*a* of the upper and lower covers 13 and 14, respectively. As shown in FIG. 5, vertical slits 13*b* and 14*b* are formed in this upper cover 13 and the lower cover 14, respectively.

As described above, in the free ball 16 of the ball unit 12 attached to the gap portion 8, the upper and lower portions of the free ball 16 are protruded from the opening portions 13*a* and 14*a* of the split cover 15. Thus the upper and lower portions of the free ball 16 are respectively protruded from a surface of a loading portion 3 (conveying surface) and a lower end 6 of the link so that they are protruded from the upper and lower surfaces of the conveyor chain 1.

As described above, the present invention has been explained by use of a structure of the conveyor chain 1 as an example. However, the chain links 2, 2*a*, the hinge pin 7, the upper and lower covers 13, 14, the free ball 16, the pin disengagement preventing member 19 and the like are preferably made of engineering plastics because they are lightweight and easy handling, but they may be made of plastics and metallic. Particularly, since the material of the split cover 15 consisting of the upper and lower covers 13 and 14 can be variously changed, the selection and combination of better materials are allowed by taking the strength of the chain link 2 and wear between the split cover 15 and the free ball 16 and the like into consideration. Further, a groove for discharging wear powder generated between the split cover 15 and the free ball 16 may be formed in the upper and lower covers 13 and 14 respectively. Further, a roller may be provided in place of the free ball.

The actions and effects of the conveyor chain 1 comprising the above-mentioned configuration are as follows. The conveyor chain 1 is wrapped between sprockets (not shown) and sprocket tooth (not shown) is placed in a space portion 6*a* (see FIG. 3 and FIG. 4) of between links 6 in the chain link 2, and is engaged with the chain while abutting on a hinge portion 5. In this case, since it is possible to use a chain link having the same size as a conventional conveyor chain without providing a free ball 16 in the conveyor chain 1, the sprockets used in the conventional conveyor chain can be used as they are as sprockets.

Since the loading portion 3 of the chain link 2 forming the conveyor chain 1 is formed of one member, a chain link 2's parts count can be reduced. Further, a plurality of hinge portions 4, 5 are formed on both side edges of the loading portion 3, the gap portion 8 is provided between the hinge portions 4, 4 formed on one-side edges of the loading portions 3, and the ball unit 12 rotatably holding the free ball 16 in the split cover 15 consisting of the upper cover 13 having the opening portion 13*a* and the lower cover 14 having the opening portion 14*a* is attached to the gap portion 8. Accordingly, the free ball 16 can be held by the split cover 15 forming the ball unit 12 without disengaging the free ball 16.

Since the upper portion of the free ball 16 provided in the conveyor chain 1 protrudes from a surface of the loading portion 3 (conveying surface), articles whose lower surfaces are flat, such as box, plate or the like disposed on the conveyor chain 1 can be slid by free rotation of the free balls 16. As a result the discharge of articles in any direction during conveyance can be easily performed and the turning of the articles can be also made.

As shown in FIG. 7, when a guide plate 17 is appropriately set on a lower surface side of the conveyor chain 1 so that the lower portion of the free ball 16 protruding from the lower end of the loading portion 3 abuts on the guide plate 17, the free ball 16 can be rotated in the traveling direction in accordance with the running of the conveyor chain 1. Thus, the articles can be more speedily (at a double speed) conveyed with the guide plate 17 arrangement portion.

Further, in a case where the upper or lower cover 13, 14, the free ball or the like is replaced, the ball unit 12 can be removed only by pulling out the hinge pin 7 to separate the chain link 2. Further, the attachment of the free ball 16 is allowed only by attachment of the ball unit 12 to the gap portion 8. As a result the assembly and explosion of the conveyor chain 1 can be performed so that the part replacement of the upper and lower covers 13, 14 forming the split cover 15, the free ball or the like can be easily made.

In a case where vertical slits 13*b* and 14*b* are respectively formed in the upper and lower covers 13 and 14 consisting of the split cover 15, when the free ball 16-rotatably-accommodated ball unit 12 is inserted into the gap portion 8, the split cover 15 in the ball unit 12 can be slightly contracted by compressing the split cover 15 by the slit. Thus, the attachment operation of the ball unit 12 can be easily made. After the attachment of the ball unit 12 the slit width of is returned to the original width and the ball unit 12 engages the engagement protrusion 11 so that disengagement is prevented. Further, as shown in FIG. 8, force for the ball unit 12 to be pushed out of the gap portion 8 in the chain link 2 is acted by the traveling direction of the conveyor chain 1. Nevertheless since slits 13*b*, 14*b* are provided in the split cover 15, a force F to widen the slits 13*b*, 14*b* at a portion the free ball 16 contacts acts on the split cover so that the ball unit 12 can be prevented from being removed from the gap portion 8.

DESCRIPTION OF REFERENCE NUMERALS

1 . . . Conveyor chain
2, 2*a* . . . Chain link
3 . . . Loading portion
4 . . . Hinge portion
5 . . . Hinge portion
6 . . . Link
6*a* . . . Space portion
7 . . . Hinge pin
8 . . . Gap portion
9 . . . Cutout portion
10 . . . Step portion
11 . . . Engagement protrusion
12 . . . Ball unit
13 . . . Upper cover
13*a* . . . Opening portion
13*b* . . . Slit
14 . . . Lower cover
14*a* . . . Opening portion
14*b* . . . Slit
15 . . . Split cover
16 . . . Free ball
17 . . . Guide plate
18 . . . Groove
19 . . . Disengagement preventing member Those skilled in the art will readily recognize that the invention has been set forth by way of example only and that changes and modifications may be made to the examples without departing from the spirit and scope of the invention as set forth in the claims.

The invention claimed is:

1. A conveyor chain wherein a plurality of chain links each having a plurality of hinge portions respectively formed on both side edges of article loading portions, and having links formed on the lower surfaces of said loading portions, are adjacently, endlessly connected to each other with hinge pins, characterized in that a gap portion is provided between hinge portions formed on one-side edge in said article loading portions, a ball unit rotatably holding a free ball in a split cover consisting of an upper cover having an opening portion and a lower cover having an opening portion is attached to said gap portion and said upper and lower portions of said free ball protrudes from the opening portions of said upper and lower covers and protrudes from a surface of the loading portion and a lower end of the link respectively.

2. A conveyor chain according to claim 1, characterized in that a vertical slit is formed in the upper cover and the lower cover consisting of said split cover, respectively.

* * * * *

UNITED STATES PATENT AND TRADEMARK OFFICE

CERTIFICATE OF CORRECTION

PATENT NO. : 7,021,454 B2

APPLICATION NO. : 11/063171

DATED : April 4, 2006

INVENTOR(S) : Ozaki et al.

It is certified that error appears in the above-identified patent and that said Letters Patent is hereby corrected as shown below:

Abstract, line 1, delete "To" insert --The object of the invention is to--

Abstract, line 3, after " and" insert -- the articles also--

Abstract, line 3, after "make" insert -- a--

Abstract, line 3, after "U-turn" delete "and in which a count" insert --. Additionally, a number--

Abstract, line 12, after "on" delete "one" insert -- each --

Abstract, line 12, after "side" delete "edges" insert -- edge --

Abstract, line 12, after "3" delete ", and a" insert --. A--

Abstract, line 13, after "16" delete "in a split cover 15 consisting of a upper cover 13 and a lower cover 14"

Abstract, line 16, after "8." delete "The upper and lower portions of the free ball 1 protrudes from opening portions 13a, 14a of the upper and lower covers 13, 14 and protrudes from the upper and lower surfaces of the conveyor chain 1."

Column 2, line 8, after "invention" delete "according to claim 1"

Column 2, line 24, after "invention" delete "according to claim 2"

Column 2, line 25, after "chain" delete "according to claim 1,"

Column 2, line 31, after "invention" delete "of claim 1"

Column 3, line 1, after "invention" delete "of claim 2"

Column 3, line 61, after "on" insert -- both --

Column 3, line 62, after "rear" delete "both"

UNITED STATES PATENT AND TRADEMARK OFFICE

CERTIFICATE OF CORRECTION

PATENT NO. : 7,021,454 B2
APPLICATION NO. : 11/063171
DATED : April 4, 2006
INVENTOR(S) : Ozaki et al.

It is certified that error appears in the above-identified patent and that said Letters Patent is hereby corrected as shown below:

Column 4, line 8, after “member” delete “18” insert --19--

Signed and Sealed this

Fifth Day of June, 2007

JON W. DUDAS

*Director of the United States Patent and Trademark Office*